Oct. 29, 1968     B. C. DAVIS     3,408,607
SHIELDED CONDUCTOR FOR USE AS THERMOELECTRIC TRANSDUCER
Filed April 11, 1966
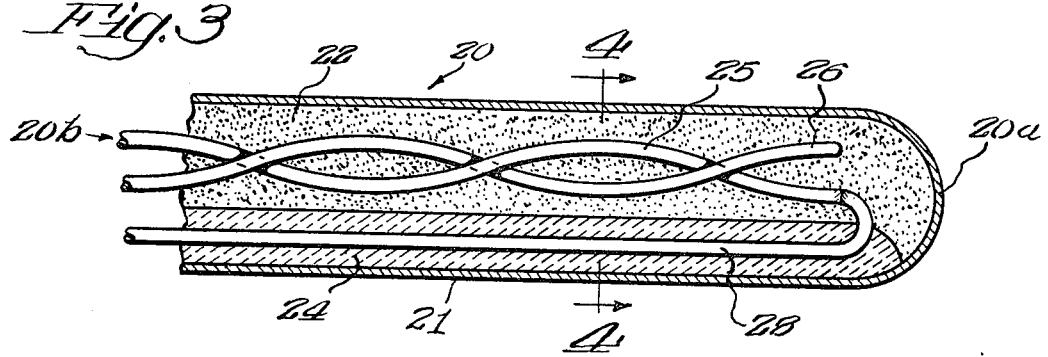
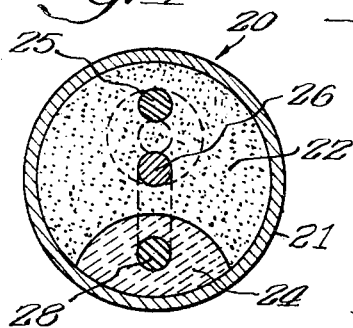
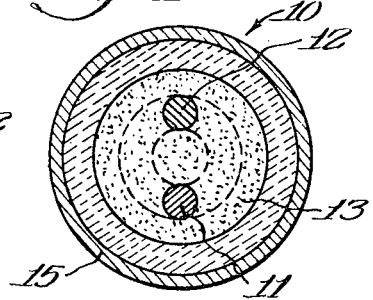
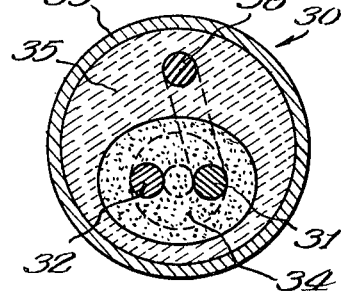
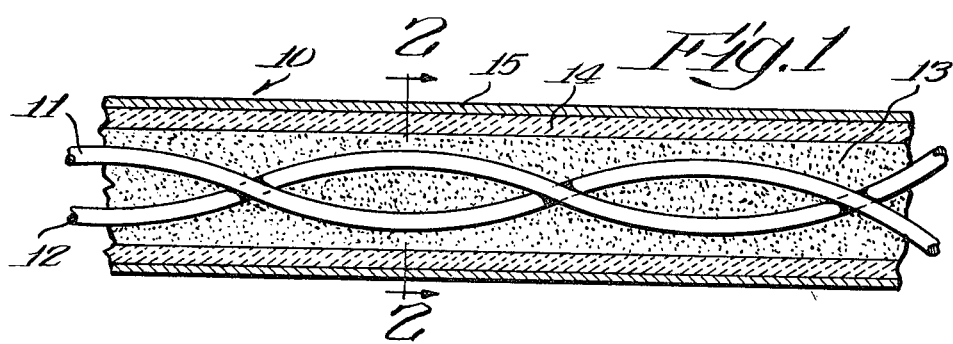
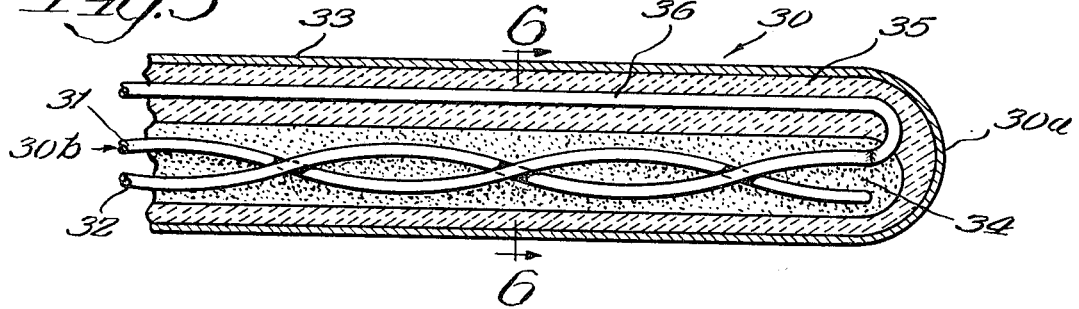
Inventor:
Bayard C. Davis
By Hume, Groen, Clement & Hume Attys.

United States Patent Office 3,408,607
Patented Oct. 29, 1968

3,408,607
SHIELDED CONDUCTOR FOR USE AS THERMOELECTRIC TRANSDUCER
Bayard C. Davis, Lombard, Ill., assignor to Continental Sensing, Inc., Melrose Park, Ill., a corporation of Illinois
Filed Apr. 11, 1966, Ser. No. 541,570
5 Claims. (Cl. 338—26)

ABSTRACT OF THE DISCLOSURE

A shielded conductor for use as a thermoelectric transducer, including at least a pair of spaced conductive wires embedded in heat-responsive semiconductor material. The outer metallic sheath is insulated from the semiconductor material by temperature-resistant electrically-insulating material. The conductive wires may be maintained in a helically wrapped configuration, and may be formed of dissimilar materials capable of establishing thermoelectric junctions across the semiconductor material. A separate voltage sensing lead may be embedded in the electrically insulating material and attached at one end to one of the conductive wires.

---

This invention relates to shielded conductors and, more particularly, to an improved shielded conductor construction capable of functioning as a thermoelectric transducer.

It is an object of the present invention to provide an improved shielded conductor capable of functioning as a thermoelectric transducer.

It is another object of the invention to provide a shielded conductor constructed so that pickup of electromagnetic noise is effectively eliminated.

It is a further object of the invention to provide an improved thermoelectric transducer for use in systems for measuring temperature.

Still another object of the invention is to provide a thermoelectric transducer for use in systems for carrying out temperature measurements and, in response thereto, selectively determining the location of temperature conditions of interest within an environment.

A fuller understanding and appreciation of the foregoing objects, as well as others, will be gained from a consideration of the following specification and claims, with illustrative reference to the drawing, in which:

FIGURE 1 is a longitudinal sectional view of a portion of one embodiment of a shielded conductor constructed in accordance with the present invention;

FIGURE 2 is a cross-sectional view taken on the line 2—2 of FIGURE 1;

FIGURE 3 is a view similar to FIGURE 1, but depicting an alternative embodiment of the invention;

FIGURE 4 is a cross-sectional view taken on the line 4—4 of FIGURE 3;

FIGURE 5 is a longitudinal sectional view of a portion of a third embodiment of the invention; and FIGURE 6 is a cross-sectional view taken on the line 6—6 of FIGURE 5.

In general, the present invention is directed to an improved shielded conductor which preferably includes at least a pair of conductive wires wrapped or twisted about one another in spaced-apart relationship along the entire length of the shielded conductor. A mass of semi-conductive material is densely compacted about the helically-wrapped wires so as to completely surround them and fill the regions defined therebetween. A layer of densely compacted temperature-resistant, electrically-insulating material surrounds the compacted semi-conductive material, and a tubular metallic sheath is in turn formed about and surrounds the layer of insulating material and is maintained in intimate relation therewith along the entire length of the shielded conductor.

Since the conductive wires are helically wrapped about one another, extraneous signal voltages stemming from inductive effects are essentially eliminated. In like manner, the outer metallic sheath eliminates extraneous signal voltages which might otherwise result from capacitive effects. Also, the shielded conductor is impervious to moisture and relatively insensitive to ambient temperature variations. Moreover, when, as is preferable, the conductive wires are composed of dissimilar materials capable of producing a Seebeck voltage as a result of thermoelectric junctions formed through the semi-conductive material, the layer of insulating material separating the sheath and the conductive wires confined within the semi-conductive material prevents the formation of thermoelectric junctions between these separated components. This eliminates the possibility of false and/or inaccurate temperature indications (e.g., as a result of the series interconnection of thermoelectric voltages) even when the shielded conductor is physically damaged and various of the conductor components are short circuited.

In an alternative embodiment of the invention, the shielded conductor is provided with a voltage-sensing lead, which is embedded in the layer of insulating material and connected at one end to the end of one of the conductive wires. For clarity of illustration, the sensing lead employed in two of the three illustrated embodiments is depicted as being disposed substantially parallel to the helical axis of the conductive wires. (Although such a construction is feasible, it is generally preferable that the sensing lead also be helically wrapped about and maintained in insulated spaced relationship relative to the conductive wires, and this construction is readily produced in accordance with the preferred method of fabricating the embodiments of the conductor structure hereinafter described.) This alternate embodiment is particularly suitable for use as a thermoelectric transducer in a system designed to carry out temperature measurements and, in response thereto, selectively determine the location of particular temperature conditions of interest within an environment. One such system is the subject of copending application Ser. No. 541,569, filed Apr. 11, 1966. As more fully explained therein, the voltage-sensing lead functions as a high impedance probe to enable measurement of a voltage drop across the conductive wire to which the voltage-sensing lead is attached. In this manner, when energy from an energy source is supplied to the shielded conductor, it is possible to obtain an accurate determination of the location of a particular temperature condition within the monitored environment.

It should be understood that when the shielded conductor is suitably constructed to function as a thermoelectric transducer, temperature-representative thermoelectric signals or voltages are generated in accordance with the well known Seebeck effect in response to the transducer being exposed to environmental temperature conditions that differ from ambient conditions. More specifically, the thermoelectric transducer is preferably constructed both of materials which exhibit appropriate thermoelectric properties and of semi-conductive material characterized by a negative temperature coefficient of resistance. These materials are cooperatively arranged to form the transducer so that the thermocouple junctions which yield the temperature-representative thermoelectric voltages are established through the semi-conductive material. Accordingly, when the transducer is disposed within an environment to be monitored and is arranged so that the temperature conditions of the environment at any desired location are sensed, the output of the transducer will yield a voltage signal indicative of the most extreme temperature condition to which a particular segment thereof has been exposed due to the fact that the thermoelecric voltages are generated in parallel. The presence of the temperature-resistant insulating layer that separates the confined conductor components from the sheath (e.g., as with the embodiments shown in FIGURES 1 and 2 and FIGURES 5 and 6) and/or that separates the voltage sensing lead and the conductive wires (e.g., as with the embodiments of FIGURES 3 and 4 and FIGURES 5 and 6) precludes the formation of thermoelemtric junctions between these separated components. Accordingly, in the event of damage and consequent short circuiting of various of the elements of the transducer, unreliable and/or inaccurate readings that might otherwise stem from the existence of such junctions are eliminated.

A shielded conductor embodying the features of the present invention is shown in FIGURES 1 and 2. The illustrated shielded conductor, which is generally designated by the numeral 10, includes a pair of conductive wires 11 and 12, a mass or layer 13 of semi-conductive material surrounding the wires, a second layer 14 of insulating material surrounding the semi-conductive material, and a protective sheath 15 that encompasses the entire structure. The wires 11 and 12, which can be formed of any of a number of suitable conductive materials, are preferably twisted or helically wrapped in generally uniform fashion about one another, and are maintained in spaced-apart relation from each other, along the entire length of the shielded conductor 10. In this latter connection, the conductor 10 may employ a pair of parallelly arranged conductive wires but the conductive wires are preferably arranged in accordance with the teaching of United States Letters Patent No. 3,205,296.

The semi-conductive material forming the layer 13 is preferably characterized by a negative temperature coefficient of resistance (e.g., a composite of manganese, in principal part, silicon, lead, aluminum, barium, and other minor constituents). The insulating layer 14 is formed of suitable temperature-resistant insulating material (e.g., magnesium oxide), and completely surrounds the semi-conductive material 13. These concentric layers are in turn confined within the relatively thin and generally flexible tubular sheath 15 which is preferably formed of a material such as stainless steel.

The steps of a preferred method of forming the shielded conductor 10 are subject to variation depending upon the length and diameter of the shielded conductor to be formed, whether the conductor is to be single or double ended in terms of accessibility to the conductive wires 11 and 12, etc. However, in a typical fabricating process, the sheath 15, the conductive wires 11 and 12 and a plurality of suitably apertured pellets of the semi-conductive material 13 and of the insulating material 14 are preferably assembled as a relatively compact unit and advanced through suitable die structures so that the conductor is formed as an integral assembly. These operations positively and densely compact the layers 13 and 14 about the wires, eliminate void spaces within the shielded conductor, and bring the outer sheath into confining relationship with the enclosed elements so as to yield the construction as shown in FIGURE 1. A preferred fabricating process applicable to forming conductors in accordance with the present invention is disclosed and claimed in United States Patent No. 3,353,260, issued Nov. 21, 1967.

A shielded conductor 10 as described above can be produced in any desired length, either single or double-ended, and is highly suitable for use in a variety of applications. As one example, the shielded conductor 10 can be employed as a thermoelectric transducer in a temperature measuring system. In such application, the conductive wires 11 and 12 are composed of suitable dissimilar thermoelectric materials (e.g., Alumel and Chromel). When the shielded conductor is exposed to temperature conditions which differ sufficiently from ambient conditions, one or more thermoelectric junctions are established between the conductive wires 11 and 12 through the layer 13 of semi-conductive material. Typically, a plurality of such junctions may be established since it is anticipated that the elongated shielded conductor 10 will be exposed to a variety of temperature conditions along its length. However, because the thermoelectric voltages generated at each such junction are electrically connected in parallel, the voltage appearing across the ends of the conductive wires 11 and 12 is indicative of the maximum temperature condition subsisting along the exposed length of the shielded conductor 10. This will hold true even where physical damage to the shielded conductor may cause shorting of various of the conductor elements, since the layer 14 of temperature resistant insulating material (e.g., MgO) precludes the establishment of thermoelectric junctions between the separated conductive wires 11 and 12 and the sheath 15, which might otherwise lead to inaccurate and misleading temperature readings.

FIGURES 3 and 4 illustrate another form of shielded conductor embodying the invention. As shown therein, the shielded conductor 20 is comprised of an external temperature-resistant sheath 21 (e.g., stainless steel), a pair of helically-wrapped conductive wires 25 and 26, a lead 28, and a bi-constituent, densely compacted mass of semi-conductive and insulating materials that confine and physically separate the conductive wires and lead. The sheath 21 may be closed at one end, as indicated by the numeral 20a. As in the case of the embodiment depicted in FIGURES 1 and 2, the conductive wires 25 and 26 are preferably formed of suitable dissimilar thermoelectric materials, and are surrounded by a densely compacted mass or layer 22 of a semi-conductive material characterized by a negative temperature coefficient of resistance.

Coextensive with the mass of semi-conductive material 22 is a layer 24 of a temperature-resistant insulating material such as magnesium oxide. Embedded within the layer of insulating material 24 is the voltage-sensing lead 28 which is preferably formed of a suitable conductive material such as stainless steel. It will be noted that the voltage-sensing lead 28 is physically and electrically connected at one end to one end of the conductive wire 25. As previously described, it should be understood that the fabrication technique preferably employed to produce the conductor 20 will, in addition to helically wrapping the conductive wires 25 and 26, result in the helical wrapping of the sensing lead 28 about and in insulated spaced relation relative to these conductive wires, and such a construction is, in fact, desirable in most applications.

In this configuration, the shielded conductor 20 is particularly suited for use as a thermoelectric transducer in a system for determining both the magnitude and location of temperature conditions of interest in a given environment. As indicated above in connection with FIGURES 1 and 2, when the shielded conductor 20 is exposed at various points along its length to temperature conditions sufficiently in excess of ambient conditions, a plurality of thermoelectric junctions are established at such points (but not between the conductive wires and the sensing lead), and a voltage indicative of the maximum temperature condition appears across the conductive wires 25 and 26. In order to locate this point of maximum temperature in terms of its position along the length of the shielded conductor 20, energy or current from a suitable external source (not shown) is supplied at the input end 20b to the conductive wire 25. A circuit for the externally supplied current is provided through the layer 22 of the semi-conductive material at the point of minimum impedance created by the maximum temperature condition, thence either to the conductor 26 or to the sheath 12 so as to complete the circuit.

In a system such as is described and claimed in the aforementioned copending application Ser. No. 541,569, the voltage-sensing lead 28 is connected to a voltage measuring device characterized by an extremely high input impedance (not showgn), and the lead 28 functions solely as a sensing probe. Thus it is possible to obtain an accurate measurement of the magnitude of the voltage drop generated by the externally supplied current along that portion of the conductive wire 25 which lies between the supply end 20b and the point of maximum temperature. By suitable calibration techniques, this voltage drop is translated into an indication of the length of the segment of the conductive wire 25 through which the current is supplied and, consequently, yields a direct indication of the location of the point of maximum temperature as measured from the supply end 20b of the shielded conductor 20.

FIGURES 5 and 6 depict still another embodiment of a shielded conductor 30 constructed in accordance with the present invention. As shown therein, the shielded conductor 30 is comprised of a pair of helically-wrapped spaced-apart conductive wires 31 and 32 disposed within an external temperature-resistant sheath 33 which, as shown, may be closed at one end 30a. The conductive wires 31 and 32 are, again, preferably formed of suitable dissimilar thermoelectric materials and are completely surrounded by a mass or layer 34 of semi-conductive material. The semi-conductive material layer 34 is in turn enveloped by a layer 35 of high temperature-resistant insulating material (e.g., MgO), and the entire structure is encompassed in intimate relation by the sheath 33. As shown, a voltage-sensing lead 36 is completely embedded within the layer of insulating material 35 and is electrically and physically attached at one end to one end of the conductive wire 32. These various components are preferably formed of the materials suggested above for the like components of the embodiment illustrated in FIGURES 3 and 4, and the voltage sensing lead 36 is also preferably helically wrapped about and in insulated spaced relation to the conductive wires 31 and 32, although for purposes of clarity is shown in spaced parallel relation to said wires.

As with the embodiment depicted in FIGURES 3 and 4, the shielded conductor 30 is particularly well suited for use as a thermoelectric transducer in a system designed to function both as a temperature-measuring and temperature-locating device. In such application, when the shielded conductor 30 is exposed to a variety of temperature conditions along its length, a plurality of thermoelectric junctions are established between the conductive wires 31 and 32, through the semi-conductive layer 33, and a thermoelectric voltage indicative of the maximum temperature condition is generated across the conductive wires.

In order to establish the location of this maximum temperature condition, current is supplied to the conductive wire 31 at the input end 30b of the conductor 30. As outlined above, a circuit for such current is provided through the semiconductive material at the point of minimum impedance caused by the maximum temperature condition, thence to the conductive wire 32, which in this mode is grounded. The voltage-sensing lead 36, in conjunction with a high input impedance voltage measuring device, functions as a high impedance, voltage probe, and enables an accurate determination of the voltage drop generated across that portion of the conductive wire 31 lying between the conductor input end 30b and the point of maximum temperature. The location of the maximum temperature condition of interest is again determined by suitable calibration and translation. Since the temperature resistant, insulating layer 35 completely surrounds the layer of semi-conductive material 34 and the conductive wires 31 and 32 confined therein, the establishment of thermoelectric junctions between these wires 31 and 32 and the sheath is precluded, and thus, as with the embodiment of FIGURES 1 and 2, ensures reliability even where a portion of the shielded conductor 30 is physically damaged.

It should be understood that the foregoing is merely illustrative of various embodiments of the invention. A number of improved conductor structures employing bi-constituent insulating media that confine either parallel or helically wrapped conductive wires supplemented, if desired, by the inclusion of a voltage sensing lead might be devised without departing from the teaching set forth above. In this connection, it will be appreciated that the present invention provides an improved form of conductor structure that can be employed as a thermoelectric transducer. Various embodiments of the conductor structure are particularly suitable for temperature measuring-locating systems and, in any event, embodying a construction such that reliable signals are derived therefrom notwithstanding the fact that physical damage might otherwise be imparted to the conductor.

Variations in the construction of the aforedescribed embodiments and/or various modifications that might be made therein to render an embodiment of the conductor structure suitable for a particular application would not constitute a departure from the invention, various features of which are set forth in the accompanying claims.

What is claimed is:

1. A shielded conductor which comprises at least a pair of conductive wires, said wires being formed of dissimilar materials suitable for effecting a thermoelectric junction, a layer of semi-conductive material densely compacted about and surrounding said conductive wires so as to maintain said wires in spaced apart relation along the length of said conductor, said semi-conductive material having an inverse temperature-resistance characteristic, a densely compacted layer of high temperature-resistant electrically-insulating material completely surrounding and confining said layer of semi-conductive material, and a tubular metallic temperature-resistant and moisture-impervious sheath formed about and surrounding said confined wires and layers so as to yield an integral and contiguous conductor assembly.

2. A conductor structure according to claim 1 and wherein said confined conductive wires are helically wrapped about each other in repeated fashion and maintained in substantially uniform spaced apart relationship within said layer of semi-conductive material.

3. A conductor structure according to claim 1 wherein said sheath defines an enclosed terminal end for said conductor and said conductive wires terminate short of said terminal end and including a voltage-sensing lead that extends through and is confined within said layer of insulating material, said voltage sensing lead being maintained in insulated spaced relation to said sheath and said conductive wires except adjacent said terminal end of said conductor whereat the end portion only of said lead is physically and electrically connected to the end portion only of one of said conductive wires.

4. A conductor structure according to claim 2 wherein said sheath defines an enclosed terminal end for said conductor and said conductive wires terminate short of said terminal end and including a voltage-sensing lead that extends through and is confined within said layer of insulating material, said voltage sensing lead being maintained in insulated spaced relation to said sheath and said conductive wires except adjacent said terminal end of said conductor whereat the end portion only of said lead is physically and electrically connected to the end portion of one of said conductive wires.

5. A shielded conductor comprising at least a pair of conductive wires repeatedly helically wrapped about and spaced apart from one another uniformly along the entire length thereof; said conductive wires being formed of dissimilar materials suitable for forming a thermoelectric junction; a voltage-sensing lead spaced apart from said conductive wires and being electrically connected at one end only to the end of one of said conductive wires; a bi-constituent mass of material densely compacted about said wires and said lead in a generally cylindrical configuration; a first integral constituent portion of said mass being arranged so as to completely surround said conductive wires along the length thereof, fill the regions defined therebetween and maintain the conductive wires in said helically-wrapped spaced relation; a second integral constituent portion of said mass being arranged so as to completely surround said voltage-sensing lead along the length thereof; said first constituent portion being a semi-conductive material having an inverse temperature-resistance characteristic and said second constituent portion being a temperature-resistant electrically-insulating material; and an elongated tabular metallic temperature resistant and moisture-impervious sheath formed about and surrounding said mass of material in intimate relation thereto.

References Cited
UNITED STATES PATENTS

| | | | |
|---|---|---|---|
| 2,764,659 | 9/1956 | Postal | 338—26 |
| 3,205,296 | 9/1965 | Davis et al. | 174—34 |
| 3,230,327 | 1/1966 | McDowell | 174—118 |

LEWIS H. MYERS, *Primary Examiner.*

A. T. GRIMLEY, *Assistant Examiner.*